UNITED STATES PATENT OFFICE.

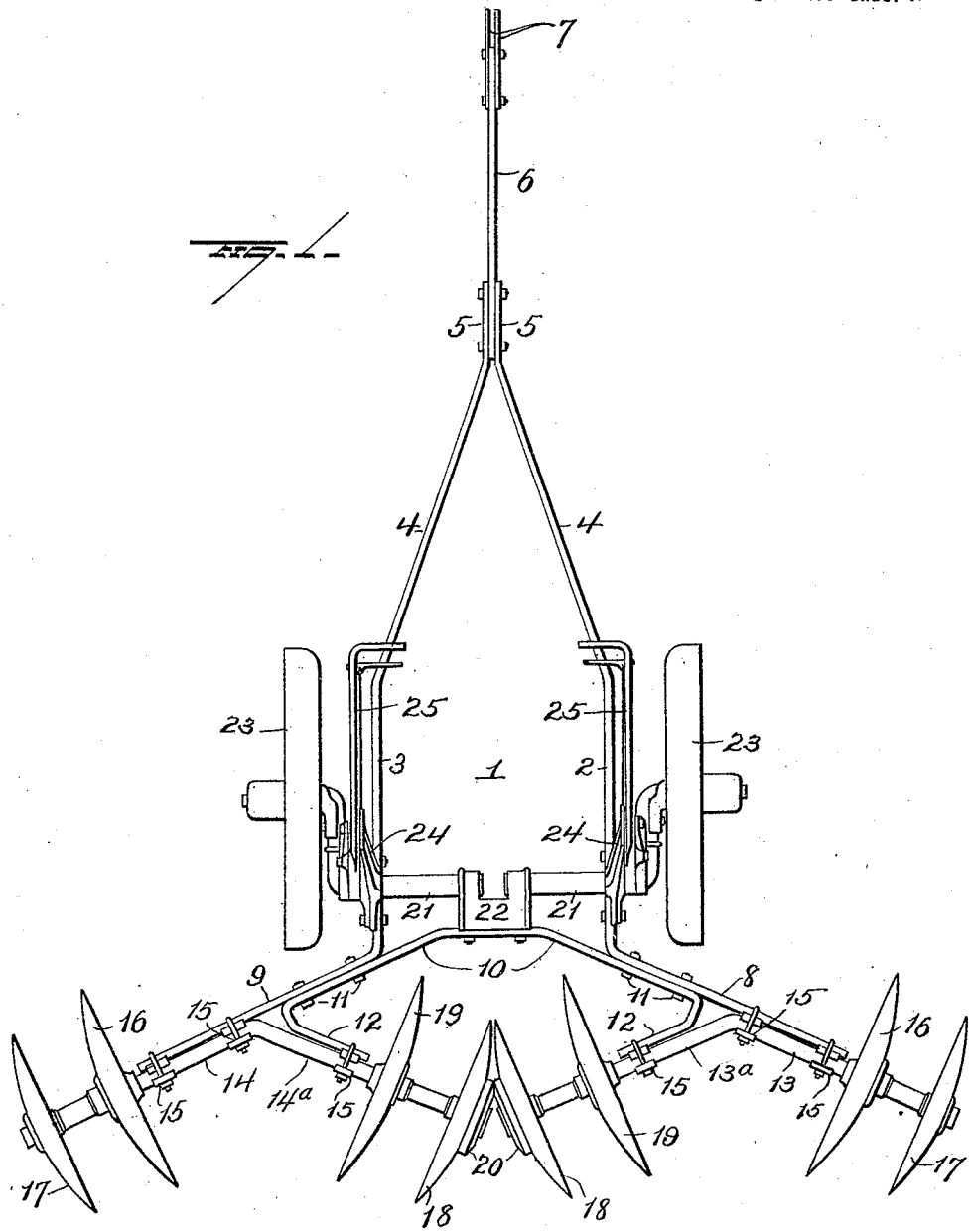

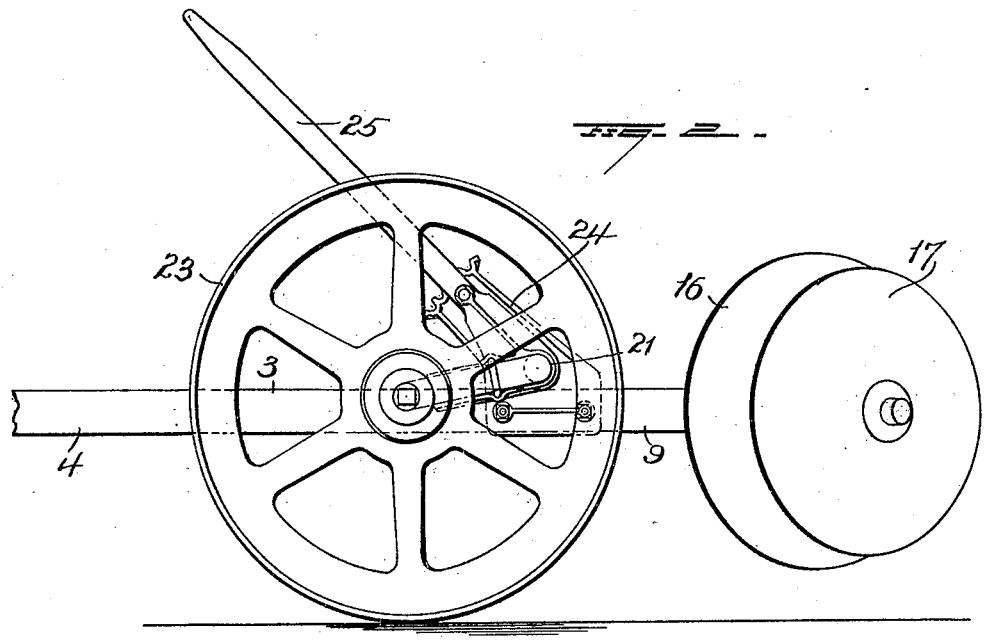
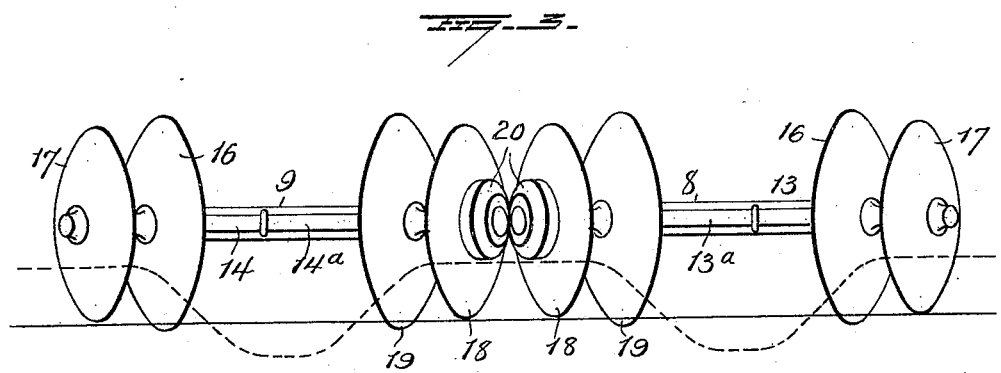

RUDOLPH J. ALTGELT, OF SOUTH BEND, INDIANA, ASSIGNOR TO OLIVER CHILLED PLOW WORKS, OF SOUTH BEND, INDIANA.

RIDGE-LEVELING IMPLEMENT.

1,405,086.   Specification of Letters Patent.   Patented Jan. 31, 1922.

Application filed October 25, 1919. Serial No. 333,251.

*To all whom it may concern:*

Be it known that I, RUDOLPH J. ALTGELT, a citizen of the United States, and a resident of South Bend, in the county of St. Joseph and State of Indiana, have invented certain new and useful Improvements in Ridge-Leveling Implements; and I do hereby declare the following to be a full, clear, and exact description of the invention, such as will enable others skilled in the art to which it appertains to make and use the same.

This invention relates to improvements in ridge-leveling implements—and more particularly to such as employ earth working disks similar to those employed with disk harrows and revolving plows.

When a field is plowed with the use of a lister plow, alternate furrows and ridges are formed and when it is desired to plant in a field in which the soil has been thus formed, with the use of a seeding machine such as a corn planter or grain drill, it is necessary to break down the ridges and thereby level the ground.

One object of my invention is to so construct the implement that the ridges between the furrows may be quickly broken down and the ground leveled.

A further object is to so construct the implement that one complete ridge and halves of two other ridges will be broken down or leveled during each passage of the implement over a field.

A further object is to so construct the implement that when the wheels run out of the ends of furrows, the disks will be raised above the level of the ground, and thus obviate necessity for the use of manually operable lifting means.

A further object is to construct the implement in such manner as to facilitate the adjustment of the disks for depth of penetration and so that the implement may be leveled.

With these and other objects in view the invention consists in certain novel features of construction and combinations of parts as hereinafter set forth and pointed out in the claims.

In the accompanying drawings; Figure 1 is a plan view illustrating an embodiment of my invention; Figure 2 is a side elevation and Figure 3 is a partial view.

1 represents a frame comprising side beams 3 having converging forward portions 4 which terminate at their forward ends in parallel arms 5, and between the latter, the rear end of a draw bar 6 is secured. Clevis members 7 are secured to the forward end of the draw bar for connection with draft means such as a tractor.

The rear ends of the frame beams 2—3 are provided with laterally and rearwardly projecting beam extensions 8 and 9 respectively, and these beam extensions are connected by a bent cross beam 10 which is secured to said beam extensions by bolts 11, and the respective ends of said cross beam are bent to form inwardly and rearwardly projecting arms 12.

Bent axles comprising axle members 13, 13$^a$ and 14, 14$^a$ are secured to the beam extensions 8, 9 and the arms 12 of the cross beam 10, by means of clamps 15, the members of each axle being disposed at an obtuse angle to each other.

Earth working disks 16, 17 are mounted on the projecting end portions of each axle member, 13, 14, said disks having outer convex faces and inner concave faces, and the outer disk 17 of each pair may be somewhat smaller than the inner disk 16.

Pairs of earth working disks 18, 19 are mounted on the inwardly projecting axle members 13$^a$, 14$^a$, said disks having outer concave faces and inner convex faces, and the inner disks 18 may be somewhat smaller than the outer disks 19.

It will be observed that the outer pairs or gangs of earth working disks 16—17 are disposed at an obtuse angle to the inner pairs or gangs of disks 18—19 and that the latter are disposed centrally between the former. The inner disks 18, 18 of the central pairs or gangs of disks are disposed at an angle to each other approximately in line with the longitudinal center of the implement and are provided with abutting enlargements 20.

The frame beams 2—3 are provided with suitable bearings for crank-axle members 21—21, the inner end portion of each of which is mounted in a bracket 22 secured to the central portion of the cross beam 10, and the spindle portions of said axle members enter the hubs of carrying wheels 23.

Toothed segments 24 are secured to the frame beams 2, 3, and levers 25 are secured to the axle members and provided with suitable detents to engage the toothed segments. By means of these levers, the crank axle members may be adjusted to regulate the depth of penetration of the disks, and said levers may also be manipulated to level the implement.

The carrying wheels are so mounted and proportioned that they will run lower than the disks so that when said wheels are running in the furrows or ditches between ridges, the disks will penetrate the ridges sufficiently to break them down and distribute the soil of which said ridges are composed, into the adjacent furrows or ditches. When the wheels run out of the ends of furrows or ditches, the frame will be so raised as to lift the disks clear of the ground and hence no manually operable lifting means are necessary for raising the disks at the ends of a field and when it is desired to turn the implement. It is apparent that when the implement is being transported over a road or other locality to the field, the disks will be supported by the wheels, clear of the ground.

With the arrangements of disks as hereinbefore described, the central pairs of disks will operate to break down and level a complete ridge and the two outer pairs of disks will operate to break down and level halves of two other ridges, as indicated by the dotted line $a$ in Figure 3 and the soil will be made substantially level as indicated by the line $b$. During a subsequent trip of the implement across the field, the other half of one of the ridges will be leveled and a complete ridge and one-half of another ridge will be leveled.

Various changes might be made in the details of construction of my invention without departing from the spirit thereof or limiting its scope and hence I do not wish to restrict myself to the precise details herein set forth.

Having fully described my invention what I claim as new and desire to secure by Letters-Patent, is:—

1. In a ridge leveling implement, the combination with a rigid frame, of disks supported by said frame and disposed approximately in line with the longitudinal axis of the frame and arranged at an angle to each other and having abutting central portions, and side disks also carried by said rigid frame and laterally removed from the respective central disks, each side disk disposed at an angle to the nearest central disk.

2. In a ridge leveling implement, the combination with a rigid frame, of concavo-convex disks arranged back-to-back in close proximity to each other and at an agle to each other approximately in line with the longitudinal center of the frame, and side concavo-convex disks mounted on the rigid frame and disposed at an angle to the respective central disks, said side disks arranged to present their concave faces toward the concave faces of the central disks.

3. In a ridge leveling implement, the combination of a substantially rigid frame, ridge leveling disks carried thereby, and carrying wheels for said frame, said carrying wheels being so proportioned and mounted as to run in furrows when the disks penetrate ridges at respective sides of the furrows, whereby when the wheels run out of the ends of the furrows the disks will be raised.

4. In a ridge leveling implement, the combination with a substantially rigid frame, of axle members rigidly secured to the rear portion of the frame, ridge-leveling disks carried by the rigid axle members, crank axles mounted on the frame in advance of said disks, wheels in which said crank axles are mounted, levers secured to said crank axles for turning them, and means for locking said lever to the frame.

5. In a ridge leveling implement, the combination of a frame, axles secured to said frame and each comprising two members disposed at an obtuse angle to each other, and a disk gang mounted on each member of each axle, whereby two of said disk gangs will be centrally located and disposed at an angle to each other and whereby two other disk gangs will be located laterally from the central gangs and disposed at an angle to each other.

6. In a ridge leveling implement, the combination with a frame comprising side beams, rearwardly and laterally projecting extensions and a cross beam having rearwardly and inwardly projecting arms, of two axles, each comprising two members disposed at an obtuse angle to each other and secured, respectively, to said rearward and lateral extensions of the side beams and the arms of the cross beam, and disk gangs mounted on each member of each of said axles.

7. In a ridge leveling implement, the combination with a frame having extensions projecting rearwardly and laterally and a cross beam secured to said extensions and having rearwardly and inwardly projecting arms, of two axles, each comprising two members disposed at an obtuse angle to each other and secured respectively to said extensions and arms, crank axles mounted on the frame, a bracket secured to the cross beam and providing bearings for said crank axles, and wheels in which said crank axles are mounted.

8. In a ridge leveling implement, the combination with a frame, of two pairs of axle members, the axle members of each pair disposed at an obtuse angle to each other, a pair of earth working disks mounted on each axle member, whereby two pairs of said disks will be centrally disposed between the other two pairs, the disk of each pair located nearest the end of an axle member being smaller than the other disk of the same pair.

In testimony whereof, I have signed this specification in the presence of two subscribing witnesses.

RUDOLPH J. ALTGELT.

Witnesses:
 EDWIN NICAR,
 GEORGE R. LANPHERE.